United States Patent
Battlogg

(10) Patent No.: US 7,520,194 B2
(45) Date of Patent: Apr. 21, 2009

(54) DEVICE FOR SECURING TWO RELATIVELY MOVABLE PARTS

(75) Inventor: Stefan Battlogg, St. Anton i.M. (AT)

(73) Assignee: ThyssenKrupp Presta AG, Eschen (LI)

( * ) Notice: Subject to any disclaimer, the term of this patent is extended or adjusted under 35 U.S.C. 154(b) by 0 days.

(21) Appl. No.: 11/522,439

(22) Filed: Sep. 18, 2006

(65) Prior Publication Data

US 2007/0095162 A1 May 3, 2007

(30) Foreign Application Priority Data

Oct. 28, 2005 (EP) .................................. 05023614

(51) Int. Cl.
B62D 1/18 (2006.01)

(52) U.S. Cl. ........................ 74/493; 280/775

(58) Field of Classification Search .................... 74/492, 74/493; 280/775; 403/110, 256, 257, 338, 403/373–374.5
See application file for complete search history.

(56) References Cited

U.S. PATENT DOCUMENTS

| | | | |
|---|---|---|---|
| 5,988,010 A * | 11/1999 | Olgren | 74/493 |
| 6,038,941 A * | 3/2000 | Hobaugh et al. | 74/493 |
| 6,217,249 B1 * | 4/2001 | Merlo | 403/90 |
| 6,402,789 B1 * | 6/2002 | Gramnas | 623/38 |
| 6,415,476 B1 * | 7/2002 | McCoy | 16/257 |
| 2003/0080079 A1 * | 5/2003 | Wu | 211/89.01 |
| 2003/0195636 A1 * | 10/2003 | Coop | 623/36 |
| 2006/0119063 A1 * | 6/2006 | Bodin | 280/89 |
| 2006/0272604 A1 * | 12/2006 | Battlogg | 123/90.16 |

FOREIGN PATENT DOCUMENTS

| | | |
|---|---|---|
| DE | 850 103 C | 9/1952 |
| DE | 1 575 318 A1 | 3/1970 |
| FR | 2 701 911 A | 9/1994 |
| GB | 167637 A | 8/1921 |
| GB | 1 171 150 A | 11/1969 |

OTHER PUBLICATIONS

English Translation of DE 1 575 318.*
European Search Report dated Apr. 11, 2006 with English translation (eight (8) pages).

* cited by examiner

*Primary Examiner*—Richard WL Ridley
*Assistant Examiner*—Matthew Johnson
(74) *Attorney, Agent, or Firm*—Crowell & Moring LLP

(57) ABSTRACT

A device for securing two relatively movable parts (1, 2) contains at least one holding element (3) which is allocated to the first part (1) and engages into the second part (2) in a transverse manner with respect to the direction of movement of the two parts (1, 2). The second part (2) contains at least one container (7) filled with granular, preferably spherical, material (8) and embeds the holding element (3) in the material (8).

12 Claims, 2 Drawing Sheets

Figure 3:
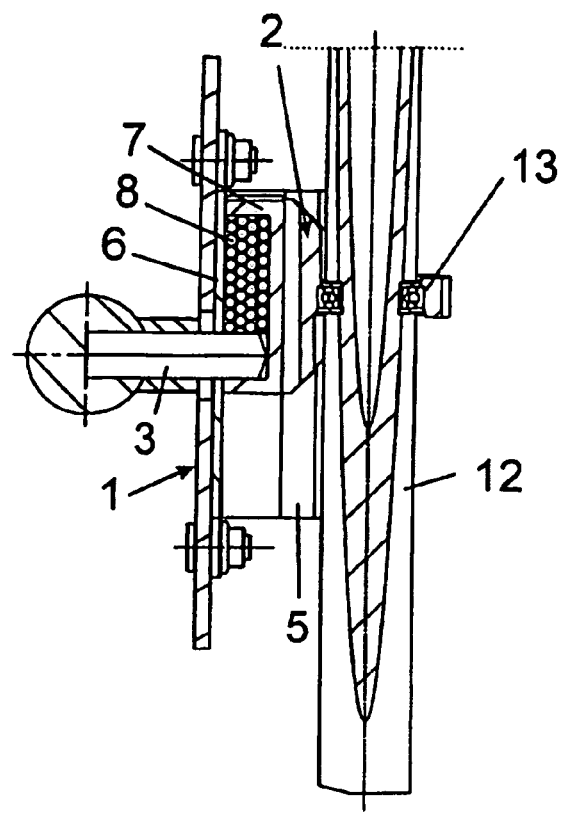

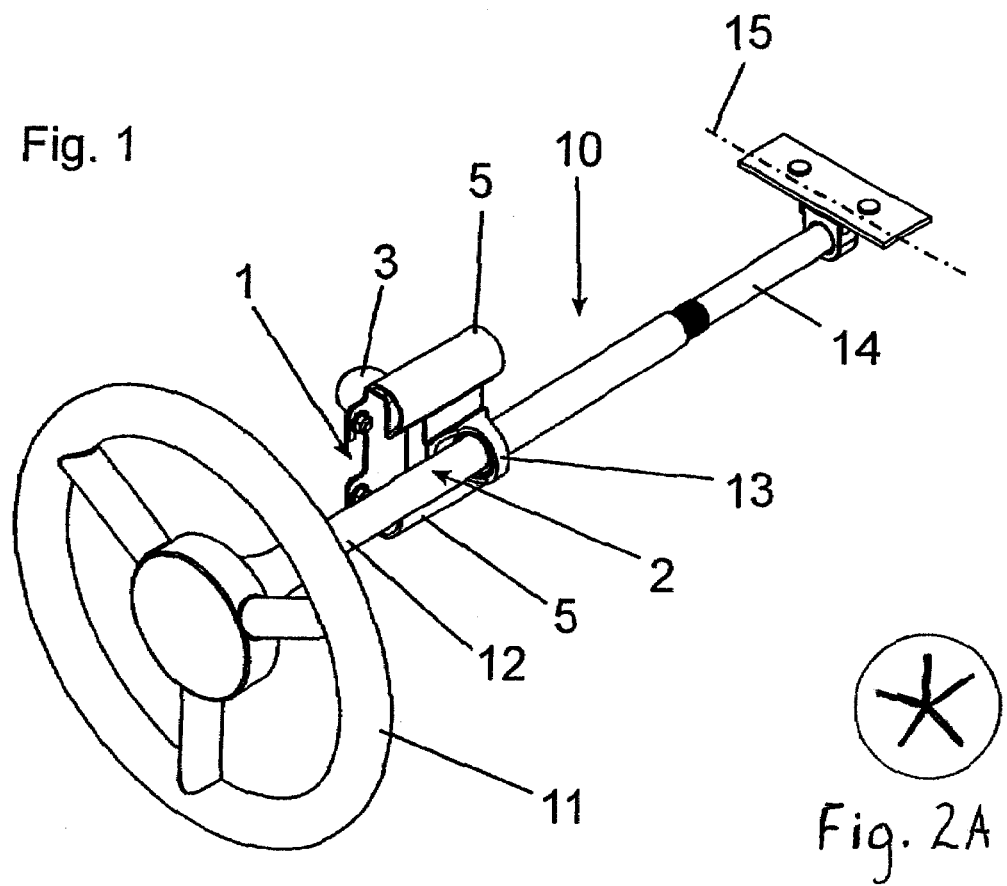
Fig. 1
Fig. 2A
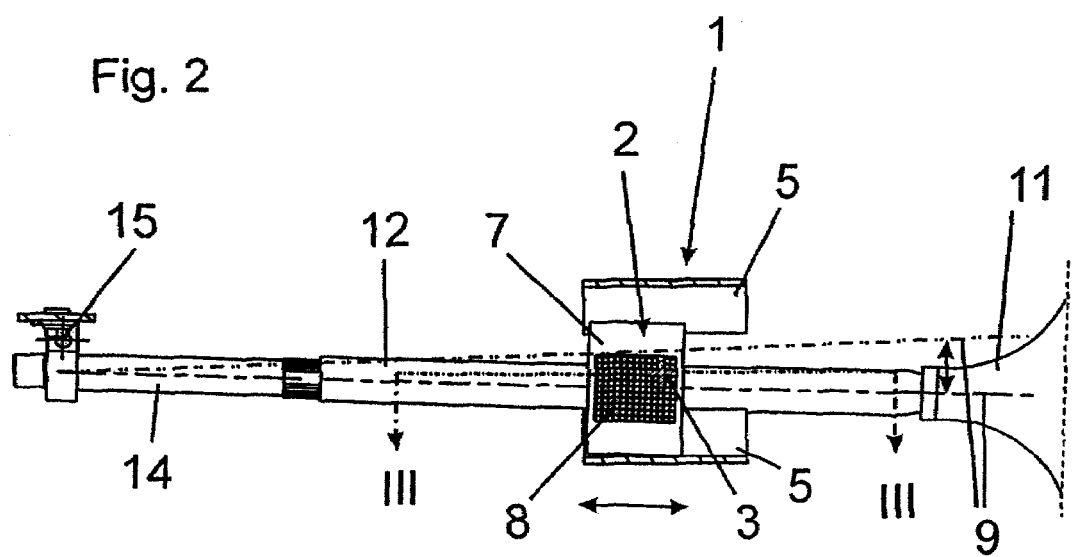
Fig. 2

DEVICE FOR SECURING TWO RELATIVELY MOVABLE PARTS

Description

The invention relates to a device for securing two relatively moveable parts by means of at least one holding element which is allocated to the first part and engages into the second part in a transverse manner with respect to the direction of movement of the two parts.

In order to secure two relatively movable parts in a positive-locking manner, attachment elements are conventionally inserted into corresponding bores and are secured therein. If the connections are to be releasable, suitable attachment elements are chosen, e.g., screws which can be unscrewed from a threaded bore or a screw nut can then be detached therefrom. The attachment is more complicated when the two parts are to be secured in different positions and in particular when the attachment positions are to be selectable at least in a virtually continuous manner. At least one further bore or the like is necessary for attachment in different positions and the attachment element can then be inserted into a bore selectively. If the desired positions are too close together, then a larger number of bores are possibly required which have different spaced dispositions and are provided for example in rows next to each other.

DE 850103 shows one possibility of securing two parts in any position. In this case, one part comprises two or three screws having a pointed end and the other part is provided with teeth in a manner similar to a saw blade, wherein the edges of the teeth are inclined at the same angle as the points of the screws. The spaced disposition between the screws does not correspond with that of the teeth so that the screws can always be arranged such that they lie against a left and a right tooth edge. They thus penetrate deep between the teeth mostly to differing extents.

The invention proposes a device of the type mentioned in the introduction, wherein the second part contains at least one container filled with granular, preferably spherical, material and the holding element is embedded in the material. In this manner, the two parts are securely held at any position within the length and width defined by the container opening.

The magnitude of the forces which can be absorbed by the holding element depends upon the friction between the material grains. Square-edged granular material can hold the parts in a more secure manner than spherical granular material. The filling depth, i.e., the number of material layers, as well as the surface governed by the cross-sectional shape of the holding element and acting against transverse displacement are also substantial criteria. The size ratios also play a role, i.e., the grain size or the diameter of the material particles with respect to the length and width of the container.

The granular material can be easily filled into the container. It is not necessary to cover the filled container when only small forces are to be absorbed and the container opening is horizontal. However, a cover is preferably provided, e.g., in the form of a plate forming a displaceable lid for the container and being allocated to the first of the two parts to be secured to each other, wherein the holding element protrudes from the plate. The plate can be flat or curved on one or two directions, i.e., it can have a cylinder barrel surface or a spherical surface. The cover and the container are guided so as to contact each other, possibly also in a sealed manner. The holding element can protrude from the plate in a perpendicular or even inclined manner and can comprise for example a cruciform or star-shaped cross-section. If the displaceability of the two parts is to be limited to only one direction, the cross-section can also be a flat rectangle. Of course, other cross-sectional shapes are also suitable.

The securing device in accordance with the invention offers a substantial advantage as part of an adjustment device which can be released and re-secured in a convenient manner. For this example, provision is preferably made that the holding element is mounted in the first part so as to be able to be displaced transversely with respect to the direction of movement of the two parts and can be retracted from the material. If a component, constructional part, machine part or the like is to be adjusted, the holding element is pulled out of the granular material, the part is correspondingly displaced or rotated in a longitudinal or transverse manner and then the holding element is inserted back into the granular material.

In this embodiment, it is advantageous if the end of the holding element embedded in the material extends in a wedge-shaped manner or into a point. The holding element can also be mounted in the first part so as to be able to rotate so that a simple manual operation is possible. The holding element can comprise for example a section wound in a corkscrew-like manner which, by means of rotation, can be screwed into the material or unscrewed therefrom. It is also possible for the holding element to be formed in two parts, wherein rotation at a handle via a thread effects the axial displacement of the section engaging into the material in the container.

The securing device in accordance with the invention, which is extremely simple, can be used in an extremely large variety of ways, wherein the important factor is, above all, the ability to select any securing position within the scope specified by the container size. The first and second parts are also interchangeable depending upon the circumstances so that the holding element can also be allocated to the displaceable or rotatable part and the container having the granular material can be allocated to the stationary part.

Mathematically speaking, the container volume is formed by the sum of the volume of the space required for the filled material and of the volume of the embedded holding element, in this case a precise positive fit is provided. For the practical implementation, the volume of the material is slightly smaller in order to ensure that the holding element can be inserted at any position without a relatively large amount of force being required. Since the material particles are displaced, the receiver opening for the holding element is newly formed each time.

The number of holding elements can be increased in order to absorb large forces, wherein several holding elements can engage into the same container or further containers can also be provided when larger spaced dispositions are required between the holding elements.

The invention will be described hereinafter with reference to a securing device for a steering column of a motor vehicle which can be adjusted in length and inclination, without being limited thereto.

Figure 4:
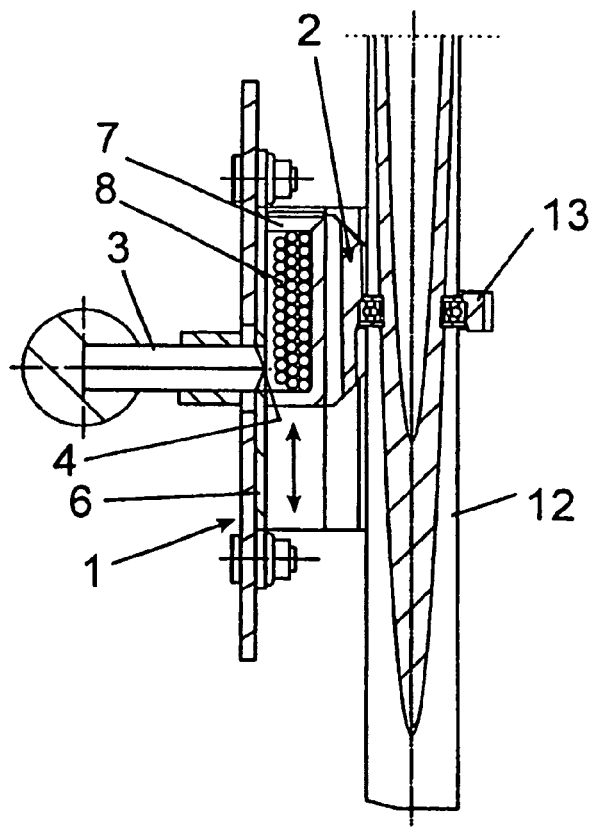

In the drawing,

FIG. 1 shows, in an oblique view, a steering column having the securing device in accordance with the invention, FIG. 2 shows a steering column in a lateral view having the securing device in a longitudinal sectional view, FIG. 2A shows an alternative embodiment in which the holding element has a cruciform cross-section, FIG. 3 shows a section taken along line III-III of FIG. 1, and FIG. 4 also shows a section taken along line III-III with the holding element in the pulled out position.

A steering column 10 of a motor vehicle comprises two tube pieces 12, 14 which can slide within each other in a telescopic manner and the inclination of the steering column can be adjusted about a transverse axis 15. The tube piece 12 connected to a steering wheel 11 is mounted in a rotatable manner in a clamp 13 which is axially secured on the tube piece 12 and is also attached to a container 7. When the tube piece 12 of the steering column 10 is displaced along its axis 9 on the tube piece 14, the container 7 moves along with it. The container 7, the tube piece 12 and the steering wheel 11 thus form a second part 2 which can be displaced and pivoted jointly with respect to a first part 1 formed by the vehicle body, in order to be able to adapt the position of the steering wheel 11 to drivers of different sizes.

The two parts 1, 2 which are relatively adjustable, in this example the vehicle body and the steering column 10, are prevented from being displaced in the desired position in accordance with the invention by at least one holding element 3, wherein the holding element 3 is allocated to the first part 1, i.e., the vehicle body, and engages into the second part 2 in a transverse manner with respect to its directions of movement and at least substantially in a positive-locking manner. In order to adjust the steering column 10, the holding element 3 can be pulled out of the second part 2 (FIG. 3) and engage back into the part 2 in the new position of the steering column 10 (FIG. 4).

The container 7 mentioned above contains granular material 8 which is formed in particular by steel balls or the like as are used for example for ball bearings. The container 7 contains approximately enough material 8 so that the difference to the maximum container volume corresponds approximately to the volume of the embedded section of the holding element 3 (FIG. 3). In this position, neither movement of the steering wheel 11 in the direction of the axis 9 nor alteration of the inclination of the steering column 10 is possible since the material particles cannot be displaced.

The part 1 fixed to the vehicle body contains a plate 6 which covers the open side of the container 7 in the form of a displaceable lid and comprises edge strips 5 engaging around the container 7. When the holding element 3, which has a cruciform cross-section for example (FIG. 2), or alternatively a star shape (FIG.2A), is in the container 7 without engaging the material 8, see FIG. 4, the tube piece 12 can be displaced with the steering wheel 11 or the steering column can be pivoted about the transverse axis 15. In order to make it easier to push in the holding element 3 in the new position, the free end is provided with a point 4.

The device in accordance with the invention enables any components, which cannot all be specified, to be used for two-dimensional securing. In general, it represents in particular a simple construction when one of several basic positions is to be selected, and in particular when adjustment between these positions is only occasionally required, or fine adjustment is to be permitted. It can also be used for seat adjustment in motor vehicle seats, for height adjustment of legs of furniture, etc.

The invention claimed is:

1. A device for securing first and second relatively movable parts, said device comprising:
    at least one holding element which is allocated to the first part and is movable to engage into the second part, in a direction transverse to a direction of relative movement of the first and second parts; wherein,
    the second part has at least one container that contains granular material;
    when engaged into the second part, the holding element is embedded into the granular material;
    a volume of said container is substantially equal to a volume of said granular material contained therein, plus the volume of a portion of said holding element that projects into the container when said holding element is engaged into the second part, wherein movement of said holding element into engagement with said second part provides a positive fit of said holding element and said granular material within said container, which positive fit precludes movement of said holding element within said container, and movement of said first and second parts; and
    the holding element protrudes from a plate of the first part forming a displaceable lid for the container.

2. The device as claimed in claim 1, wherein the holding element is mounted in the first part and is displaceable transversely with respect to the direction of relative movement of the first and second parts, and is retractable from the material.

3. The device as claimed in claim 1, wherein the holding element is mounted in a rotatable manner in the first part.

4. The device as claimed in claim 1, wherein the cross-section of the holding element is one of star-shaped and cruciform.

5. The device as claimed in claim 1, wherein an end of the holding element embedded in the material extends into a point.

6. A device for securing an adjustable steering column of a motor vehicle, said device comprising:
    a container mounted on the adjustable steering column;
    a granular material contained in said container; and
    an elongate holding element mounted on a body of the vehicle; wherein,
    said holding element protrudes from a plate which forms a displaceable lid for the container;
    said holding element is movable in a longitudinal direction of said holding element, such that said holding element is insertable into the granular material; and
    a volume of said container is substantially equal to a volume of said granular material contained therein, plus the volume of a portion of said holding element that projects into the container when said holding element is inserted into the container, wherein movement of said holding element into said second container provides a positive fit of said holding element and said granular material within said container, which positive fit precludes movement of said holding element within said container, and movement of said steering column relative to said body of the vehicle.

7. The device according to claim 1, wherein movement of said holding element into engagement with said second part causes said granular material to occupy substantially all remaining volume of said container.

8. The device according to claim 7, wherein following an engagement of said holding element and said second part all of said granular material remains within said container.

9. The device according to claim 1, wherein:
    said holding element is engageable with said second part at locations that are freely selectable along said direction of relative movement.

10. The device according to claim 1, wherein:
    said first and second parts are movable relative to each other along first and second directions; and
    said holding element is engageable with said second part at locations that are freely selectable along both of said first and second directions.

11. Clamping apparatus for securing first and second parts that are displaceably coupled to each other and are displaceable relative to each other in at least a first direction, said clamping apparatus comprising:
- a container that is fixedly mounted on said second part;
- a quantity of granular material in said container;
- a holding element comprising an elongate member which is mounted on said first part, said holding element being displaceable along a longitudinal axis of said holding element, transversely to said first direction, between a first position in which said holding element is inserted into said granular material in said container, and a second position in which said holding element is withdrawn from said container; wherein,
- said holding element is insertable into said granular material in said container at freely selectable locations along said first direction;

the volume of said quantity of granular material in said container is such that insertion of the holding element into said first position causes said granular material to occupy substantially all remaining volume of said container, wherein relative movement between said holding element and said container is precluded and the holding element protrudes from a plate of the first part forming a displaceable lid for the container.

12. The clamping apparatus according to claim 9, wherein:
- said first and second parts are displaceable relative to each other in first and second directions; and
- said holding element is insertable into said granular material at locations that are freely selectable along both of said first and second directions.

* * * * *